(12) United States Patent
Haberfelde et al.

(10) Patent No.: US 8,587,867 B1
(45) Date of Patent: Nov. 19, 2013

(54) BEAM COMBINER APPARATUS AND METHOD

(75) Inventors: Thomas E. Haberfelde, Clermont, FL (US); Mark A. Neifeld, Tucson, AZ (US)

(73) Assignee: Lockheed Martin Corporation, Bethesda, MD (US)

( * ) Notice: Subject to any disclaimer, the term of this patent is extended or adjusted under 35 U.S.C. 154(b) by 723 days.

(21) Appl. No.: 12/726,944

(22) Filed: Mar. 18, 2010

(51) Int. Cl.
*G02B 27/10* (2006.01)

(52) U.S. Cl.
USPC .......................................... 359/618

(58) Field of Classification Search
USPC ........................................... 359/618
See application file for complete search history.

(56) References Cited

U.S. PATENT DOCUMENTS

| 2007/0297061 A1* | 12/2007 | Kyomoto et al. ............. 359/618 |
| 2009/0278539 A1* | 11/2009 | Beatty ........................ 324/312 |

\* cited by examiner

*Primary Examiner* — James Jones
(74) *Attorney, Agent, or Firm* — Withrow & Terranova, PLLC

(57) ABSTRACT

A beam combining method (and concomitant apparatus) comprising, with a plurality of cascaded partially reflective surfaces, receiving images from a plurality of fields of view and combining the images into a single output optical path, and employing compressive sensing with an optical sensor receiving the combined images.

14 Claims, 2 Drawing Sheets

BEAM COMBINER APPARATUS AND METHOD

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods and apparatuses that fold several fields of view into one optical path.

2. Description of Related Art

Optical systems typically require large apertures and multiple focal planes to achieve both field of regard and high resolution simultaneously. In the prior art, sparse apertures controlled with MEMS (Micro Electro-Mechanical Systems) devices have been used to fold optical fields together.

The present invention, including use of compressive sensing technology, permits a much smaller aperture and smaller or fewer focal planes to give equivalent coverage.

BRIEF SUMMARY OF THE INVENTION

The present invention is of a beam combining method (and concomitant apparatus) comprising: with a plurality of cascaded partially reflective surfaces, receiving images from a plurality of fields of view and combining the images into a single output optical path; and employing compressive sensing with an optical sensor receiving the combined images. In one embodiment, the partially reflective surfaces comprise plate polarizing beamsplitters, preferably with a twisted nematic cell optically in front of each beamsplitter, most preferably with 90° twisted nematic cells. In another embodiment, the partially reflective surfaces comprise sparse-aperture metalized plates, preferably additionally comprising moving one or more of the plates via one or more piezo-stacks, most preferably in-plane. In yet another embodiment, the partially reflective surfaces comprise beam splitting plates, preferably additionally comprising rotating one or more of the plates via one or more piezo-stacks or employing one or more electro-optical prisms optically in front of one or more of the plates.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
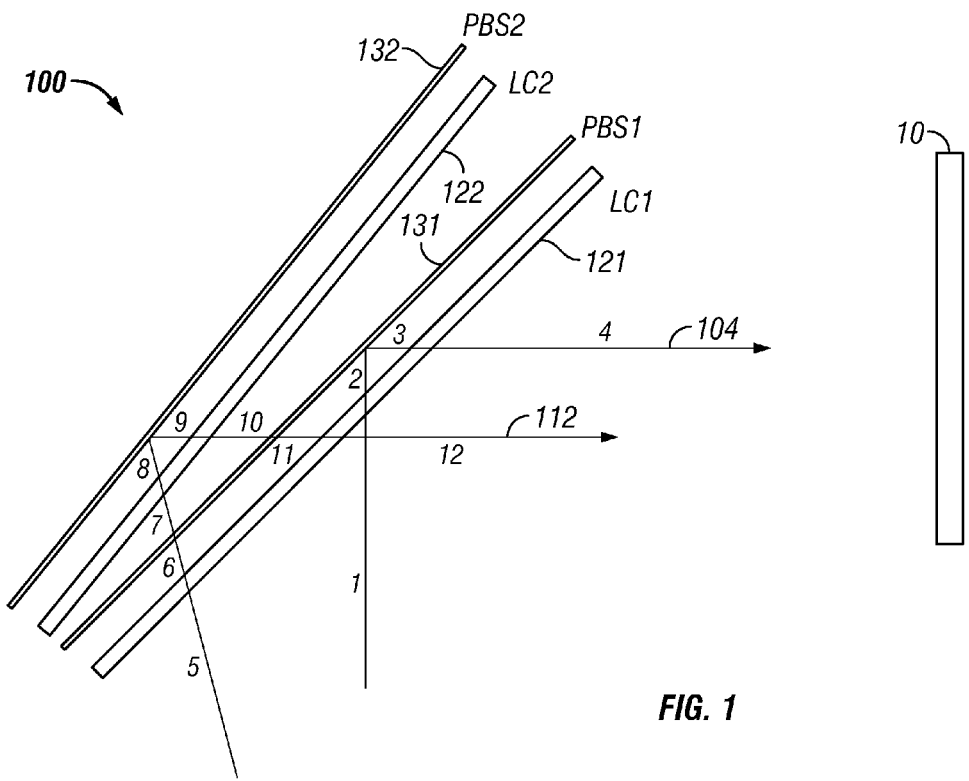
FIG. 1 is a schematic diagram of a liquid crystal (LC) switching embodiment of the invention.

The present invention comprises use of a multiple plate beam combiner that folds several fields of view into one optical path. The reflective surfaces of the beam combiner are controlled, preferably using either photochromic materials or are manipulated using piezoelectric actuators to move patterns on the surface of the beam splitters. This control is used with the focal plane measurements to disambiguate the fields of view and give the equivalent wide field coverage. The invention provides full aperture coverage without the loss in resolution due to sparse apertures and minimizes the optical footprint on the system aperture.

The benefit of compressive sensing used in conjunction with the invention is that a wide field of regard can be imaged at high resolution with a single focal plane. In order to reap the benefit, field of view combining solutions must be developed so that the size and weight of such a system does not outweigh the gains. While multi-plate beam combiners have been used before, they have not provided the dynamic capability necessary for compressive sensing, which capability is provided by the various embodiments of the present invention.

Compressive sensing, also known as compressed sensing, compressive sampling, and sparse sampling, is a technique for acquiring and reconstructing a signal utilizing the prior knowledge that it is sparse or compressible. While the general field has existed for at least four decades, recently the field has gained importance. The main idea behind compressed sensing is to exploit that there is some structure and redundancy in most interesting signals—they are not pure noise. In particular, most signals are sparse, that is, they contain many coefficients close to or equal to zero, when represented in some domain. (This is the same insight used in many forms of lossy compression.) Compressed sensing typically starts with taking a limited (possibly randomized) amount of samples in a different basis from the basis the signal is known to be sparse in. Since the amounts of samples are limited, the task of converting the image back into the intended domain would involve solving an underdetermined matrix equation—that is, there is a huge amount of different candidate images that could all result in the given samples, since the number of coefficients in the full image are fewer than the number of samples taken. Thus, one must introduce some additional constraint to select the "best" candidate. The classical solution to such problems would be minimizing the $L_2$ norm—that is, minimizing the amount of energy in the system. This is usually simple mathematically (involving only a matrix multiplication by the pseudo-inverse of the basis sampled in).

However, this leads to poor results for most practical applications, as the unknown (not sampled) coefficients seldom have zero energy. A more attractive solution would be minimizing the $L_0$ norm, or equivalently maximize the number of zero coefficients in the new basis. However, this is NP-hard (it contains the subset-sum problem), and so is computationally infeasible for all but the tiniest data sets. Thus, the $L_1$ norm, or the sum of the absolute values, is usually what is minimized. Finding the candidate with the smallest $L_1$ norm can be expressed relatively easily as a linear program, for which efficient solution methods already exist. This leads to comparable results as using the $L_0$ norm, often yielding results with many coefficients being zero.

Two basic approaches for the beam combiner are preferred, namely field of view weighting (switching) and PSF (point-spread function) engineering. These approaches are next discussed in conjunction with presentation of the embodiments 100, 200, 300, 400 of the invention shown in FIGS. 1-4.

The embodiment of FIG. 1 employs field of view weighting/switching through use of a multi-look beam combiner 100 using liquid crystal (LC) switching providing output to optical sensor 10 with compressive sensing. Basically, one combines twisted nematic cells 121,122 (preferably 90 degrees) with plate polarizing beamsplitters 131,132 (PBS). The switchable fields of view are straightforward, but the multiplexing operation is less so. Assume that LC=0 means no voltage and thus a 90 degree rotation. LC=1 means applied voltage and hence no rotation. For s-polarized input (i.e., that reflected at the PBS), one observes the following table showing output (or not) at outputs 104,112:

| LC 1/2 | Output 104 | Output 112 |
|---|---|---|
| 0/0 | 0 | 1 |
| 1/0 | 1 | 0 |
| 0/1 | 0 | 0 |
| 1/1 | 1 | 0 |

In these cases one observes switching but no multiplexing. However, intermediate voltages will yield complicated superpositions.

Figure 2:
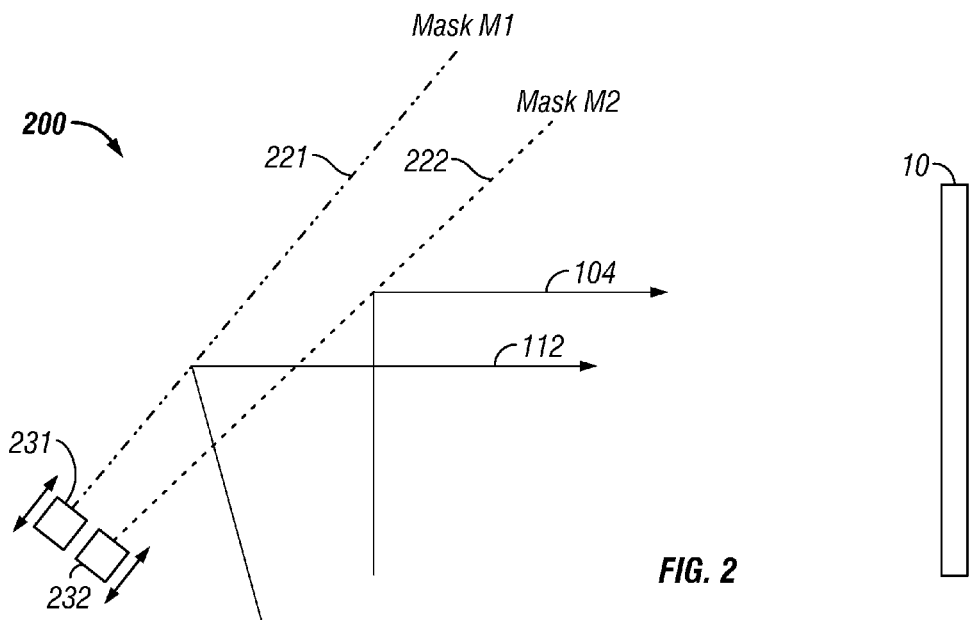
FIG. 2 is a schematic diagram of a piezo-shifting embodiment of the invention.

FIG. 2 shows a first point spread function (PSF) embodiment 200 of the invention. One preferably employs a multi-look beam combiner using sparse-aperture metallization 221, 222. The unique patterns plus cascading result in each field of view experiencing different MTF (Modulation Transfer Function). The relative motion of the individual metalized plates induced by one or both of piezo-stacks 231,232 will change MTFs, so one only needs to move one mask resolution cell. Frequency-domain de-multiplexing can then be used to recover individual fields of view, as follows. Let: $G_1$=spectrum of $FOV_1$, $G_2$=spectrum of $FOV_2$, and AC=autocorrelation function. For binary masks the measurement becomes: $G_2 AC(M2) + G_1 AC(M1-M1M2) = G_1 H_1 + G_2 H_2$. Note that $H_2$ depends upon relative positions of M1 and M2. Shifting M1, for example, will yield a new MTF $H_3$, allowing disambiguation of $G_1$ and $G_2$.

Figure 3:
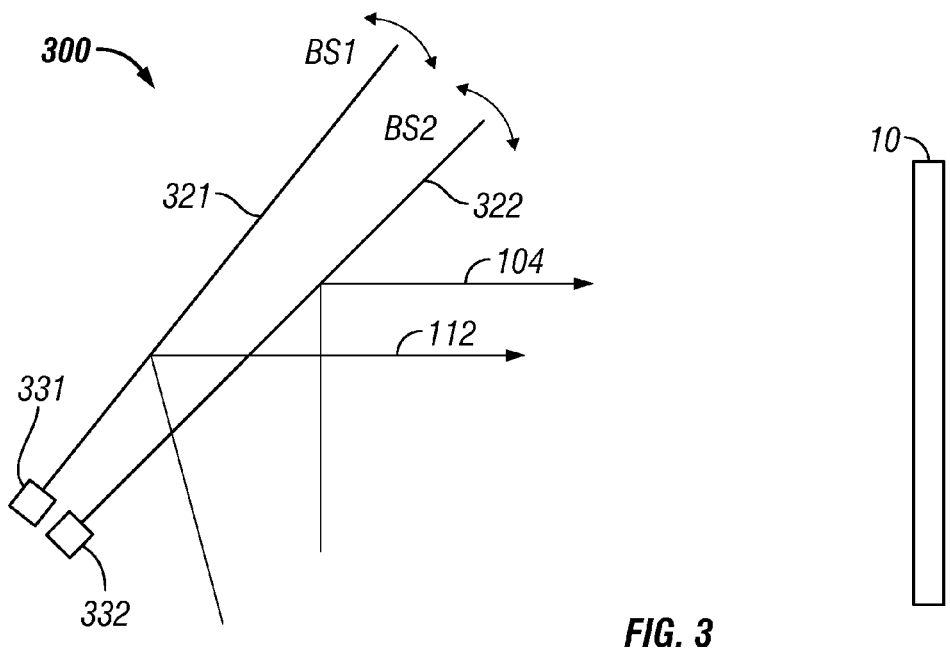
FIG. 3 is a schematic diagram of a piezo-tilting embodiment of the invention.

FIG. 3 shows a second PSF embodiment 300 of the invention, which employs piezo-tilting. The multi-look beam combiner uses simple beam splitting (BS) plates 321,322 with piezo-rotation from piezo-stacks 331,332. The BS rotation results in FOV shifting, resulting in PSF diversity.

Figure 4:
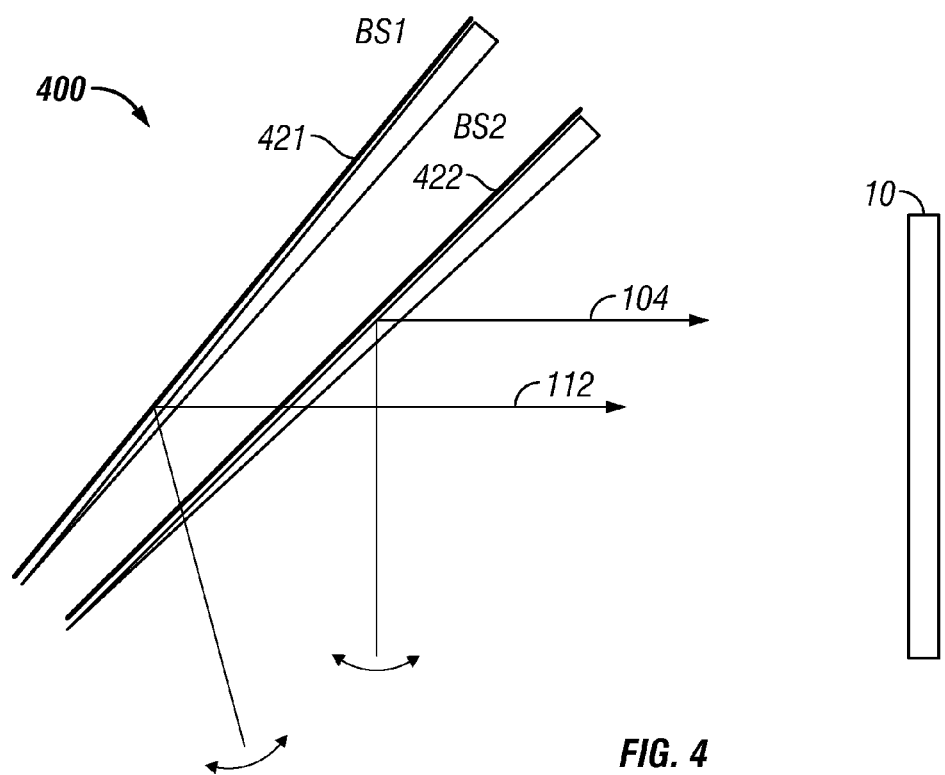
FIG. 4 is a schematic diagram of an (electro-optical) EO-tilting embodiment of the invention.

FIG. 4 shows a third PSF embodiment 400 of the invention, which employs EO-tilting. The concept and decoding are identical to the piezo-tilting embodiment. One replaces the piezo-stacks an with EO prism 421,422 so that tilting is massless. Note the cascading effect from the fact that BS2 tilt will affect FOV 1.

The present invention is advantageous because it provides an order of magnitude reduction in number of focal planes, large decrease in SWaP (Size, Weight, and Power), and no loss in resolution or coverage.

Note that in the specification and claims, "about" or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A beam combiner apparatus comprising:
a plurality of cascaded plate polarizing beamsplitters receiving images from a plurality of fields of view and combining the images into a single output optical path;
a twisted nematic cell optically in front of each plate polarizing beamsplitter; and
an optical sensor employing compressive sensing.

2. The beam combiner apparatus of claim 1 wherein each said twisted nematic cell is a 90° twisted nematic cell.

3. A beam combining method comprising the steps of:
with a plurality of cascaded plate polarizing beamsplitters, receiving images from a plurality of fields of view and combining the images into a single output optical path;
employing a twisted nematic cell optically in front of each plate polarizing beamsplitter; and
employing compressive sensing with an optical sensor receiving the combined images.

4. The method of claim 3 wherein each of the twisted nematic cells is a 90° twisted nematic cell.

5. A beam combiner apparatus comprising:
a plurality of cascaded sparse-aperture metalized plates receiving images from a plurality of fields of view and combining the images into a single output optical path; and
an optical sensor employing compressive sensing.

6. A beam combiner apparatus comprising:
a plurality of cascaded beam splitting plates receiving images from a plurality of fields of view and combining the images into a single output optical path;
one or more piezo-stacks inducing rotation in one or more of said beam splitting plates; and
an optical sensor employing compressive sensing.

7. A beam combiner apparatus comprising:
a plurality of cascaded beam splitting plates receiving images from a plurality of fields of view and combining the images into a single output optical path;
one or more electro-prisms optically in front of one or more of said beam splitting plates; and
an optical sensor employing compressive sensing.

8. A beam combining method comprising the steps of:
with a plurality of cascaded sparse-aperture metalized plates, receiving images from a plurality of fields of view and combining the images into a single output optical path; and
employing compressive sensing with an optical sensor receiving the combined images.

9. The method of claim 8 additionally comprising moving one or more of the sparse-aperture metalized plates via one or more piezo-stacks.

10. The method of claim 9 wherein the one or more piezo-stacks move one or more of the sparse-aperture metalized plates in-plane.

11. A beam combining method comprising the steps of:
   with a plurality of cascaded beam splitting plates, receiving images from a plurality of fields of view and combining the images into a single output optical path;
   rotating one or more of the beam splitting plates while receiving the images via one or more piezo-stacks; and
   employing compressive sensing with an optical sensor receiving the combined images.

12. A beam combining method comprising the steps of:
   with a plurality of cascaded beam splitting plates, receiving images from a plurality of fields of view and combining the images into a single output optical path;
   employing one or more electro-prisms optically in front of one of more of the beam splitting plates; and
   employing compressive sensing with an optical sensor receiving the combined images.

13. The beam combiner apparatus of claim 5 additionally comprising one or more piezo-stacks moving one or more of said sparse-aperture metalized plates.

14. The beam combiner apparatus of claim 13 wherein said one or more piezo-stacks move one or more of said sparse-aperture metalized plates in-plane.

* * * * *